Dec. 30, 1969     K. BURGSMÜLLER     3,486,413
SYSTEM FOR CUTTING THREADS
Filed May 1, 1967     2 Sheets-Sheet 1
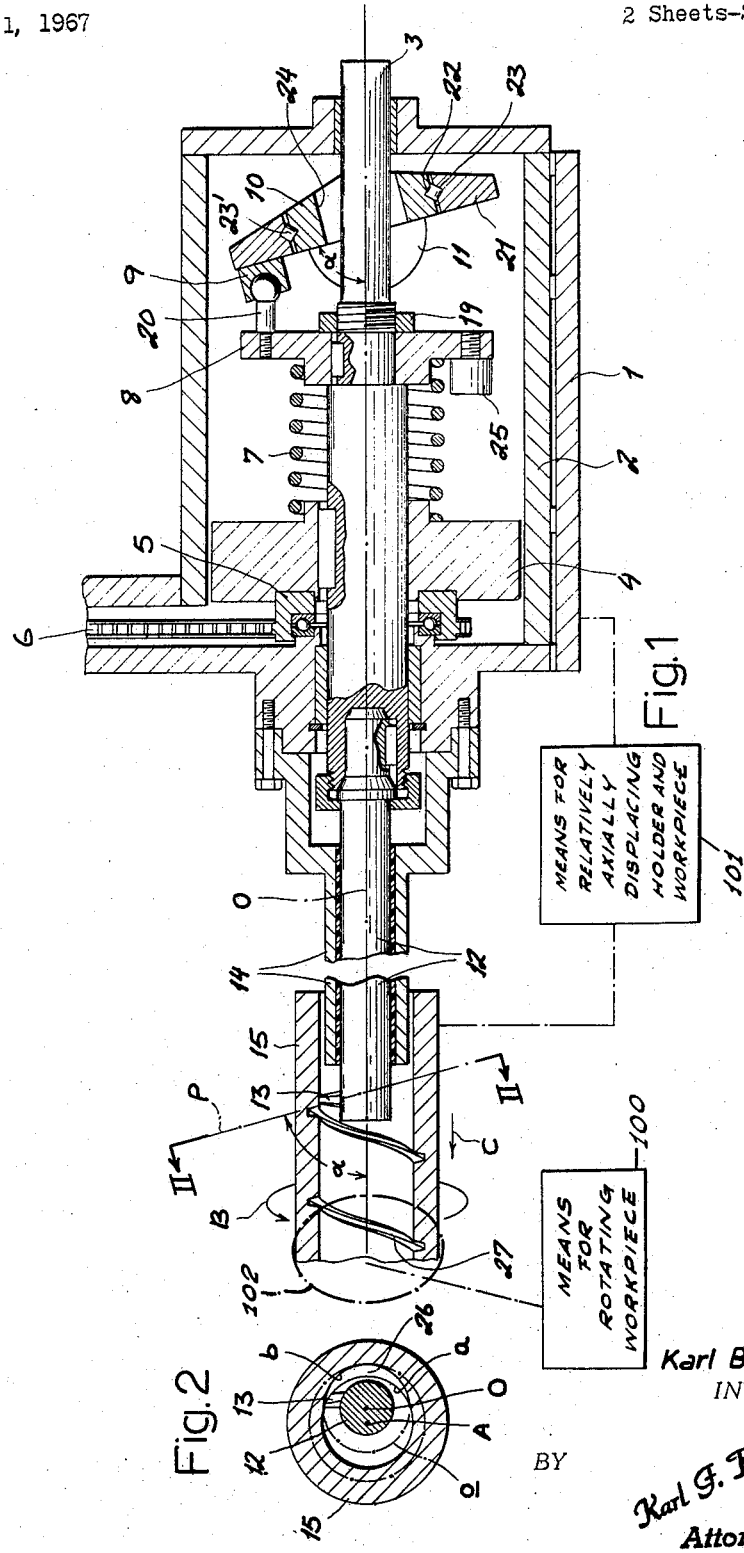
Karl Burgsmüller
INVENTOR.
BY Karl F. Ross
Attorney

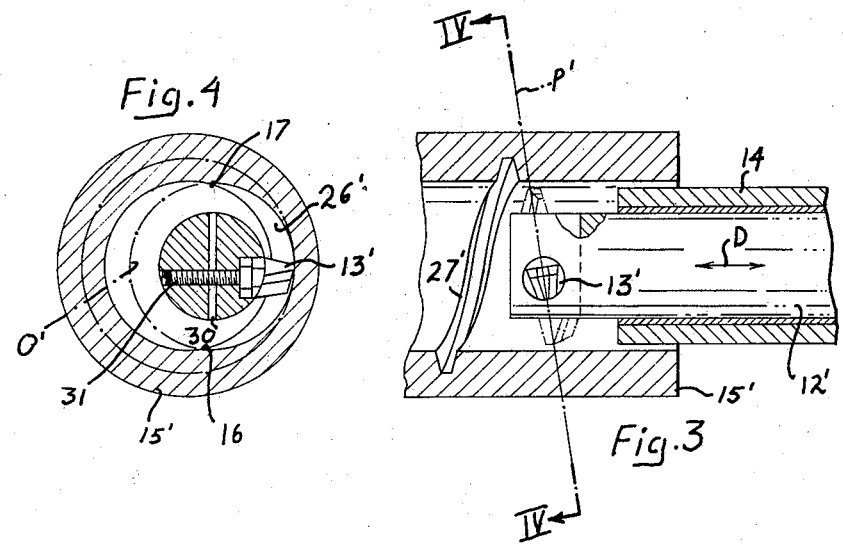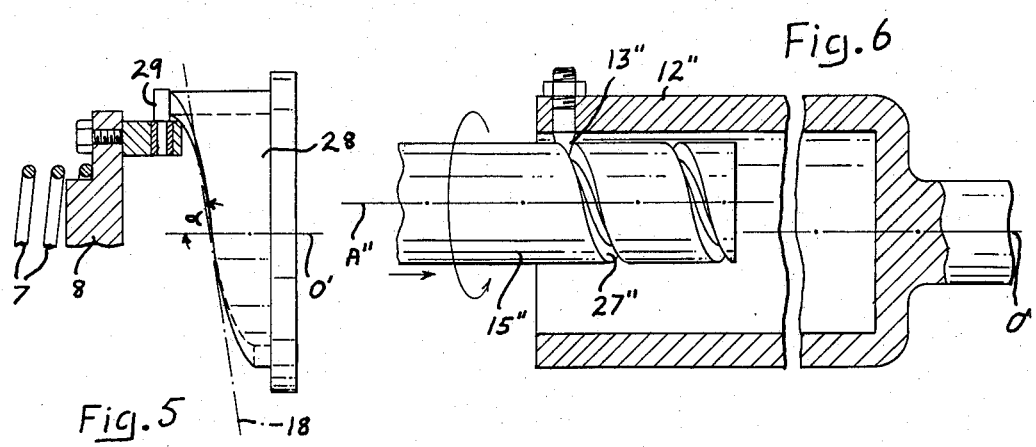

United States Patent Office 3,486,413
Patented Dec. 30, 1969

3,486,413
SYSTEM FOR CUTTING THREADS
Karl Burgsmüller, Haus Hainberg,
Kreiensen, Harz, Germany
Filed May 1, 1967, Ser. No. 635,057
Claims priority, application Germany, Apr. 30, 1966,
B 86,911
Int. Cl. B23c 3/28, 3/32
U.S. Cl. 90—11.42                    10 Claims

ABSTRACT OF THE DISCLOSURE

System for cutting internal or external threads in or on an elongated workpiece by means of a tool rotating about and reciprocating along an axis which is offset from but parallel to the axis of the workpiece whereby the tool cuts, once per revolution, into the workpiece surface to form therein a crescent-shaped notch which lies in or is tangent to a plane including with the workpiece axis an angle corresponding to the pitch angle of the thread to be produced; the workpiece is concurrently rotated about its axis and advanced axially, relatively to the midposition of the axial tool stroke, at a rate corresponding to the aforementioned ptich angle whereby the crescent-shaped notch is progressively extended over the entire workpiece surface to be threaded.

---

My present invention relates to a method of and an apparatus for cutting treads in cylindrical workpiece surfaces.

The general object of my invention is to provide a system for rapidly, efficiently and cleanly cutting male or female threads of any length on or in the outer or inner peripheral wall of such workpiece.

A more particular object of my invention is to provide automatic means for cutting such threads with different pitch angles and, if desired, different profiles without requiring any major changes in the apparatus.

These objects are realized, pursuant to the present invention, by a novel therad-cutting system in which a pointed tool is rapidly rotated about an axis and is concurrently reciprocated axially, in timed relationship with its rotation, so that its point traces an orbit which is inclined with reference to its axis of rotation. An elongated workpiece to be threaded, having an axis offset from but parallel to the axis of rotation of the tool, is then axially advanced and rotated at relatively low speed with reference to the tool and its mounting so that the tool point, along part of its orbit (i.e. once per revolution), bites into the workpiece surface along a generally crescent-shaped notch defined by the tool orbit and the cross-section of the workpiece bore. Depending upon the law of axial reciprocation of the tool, the orbit of its point is either planar or warped; the orbital plane, or a plane tangent to the orbit, includes with the axis of rotation an angle corresponding to the pitch angle of a helix substantially registering with the aforementioned notch. If, now, the workpiece and the tool (e.g. as seen in the midposition of its axial stroke) are relatively rotated and axially shifted at a rate corresponding to the same pitch angle, the crescent-shaped groove will be gradually extended over the entire workpiece surface to be threaded whereby female threads of any length can be cut.

The reciprocation of the tool in step with its rotation can be brought about, in accordance with another feature of my invention, with the aid of a guide member having an orbital formation, such as a peripheral groove or a ramp surface, with which a shaft holding the tool is held engaged while spinning about its axis. The guide member may be, for example, in the form of a peripherally grooved disk whose angle of inclination may be adjusted, e.g. as known from the swash plates of hydraulic transmissions; in this manner the pitch of the thread to be cut may be varied at will, provided, of course, that the rate of relative axial motion and/or rotation of the tool and the workpiece is correspondingly adjusted.

The invention will be described in greater detail with reference to the accompanying drawing in which:

FIG. 1 is an axial sectional view of an apparatus for cutting internal threads in accordance with my invention;

FIG. 2 is a cross-sectional view taken on the line II—II of FIG. 1;

FIG. 3 is a fragmentary sectional view similar to the left-hand portion of FIG. 1, illustrating a modification;

FIG. 4 is a cross-sectional view taken on the line IV—IV of FIG. 3;

FIG. 5 is a detail view of a modification in the right-hand part of the appartaus of FIG. 1; and FIG. 6 is a view similar to FIG. 3, illustrating the cutting of male threads.

The apparatus shown in FIGS. 1 and 2 comprises a base plate 1 rigid with a cylindrical housing 2. Journaled in this housing, for rotation about an axis O, is a shaft 3 carrying a flywheel 4 and a sprocket wheel 5, the latter being engaged by a chain 6 which is driven from a power source not further illustrated to maintain the shaft 3 at high-speed rotation. Keyed to the shaft, and held in position thereon by a lock nut 19, is a face plate 8 subjected to axial pressure from a coil spring 7 whose other end bears upon the flywheel 4. A link 20, eccentrically secured to plate 8, terminates in a spherical head received in a socket 9 to form therewith a universal joint. Socket 9 is rigid with a ring 21 which surrounds a disk 10 having a peripheral annular groove 22, a similar groove 23 on the inner periphery of ring 21 registering with groove 22 to accommodate a set of bearing elements (e.g. rollers) 23. Disk 10 is rigid with a pair of gudgeons 11 (only one shown) whih are journaled in the walls of housing 2 and can be immobilized, by means not further illustrated, in different angular positions to vary the angle α included by the forward face of disk 10 (and therefore also by the plane of its peripheral groove 22) with the axis of rotation O. Disk 10 has a central opening 24 which is traversed by the rearward extremity of shaft 3 and is large enough to permit the aforementioned angular adjustment. A counterweight 25 on plate 8, diametrically opposite link 20, serves to smooth the rotation of shaft 3, as does flywheel 4.

A tubular forward extension 14 of housing 2 rotatably supports, through the intermediary of suitable antifriction means, a mandrel 12 removably inserted into the front end of shaft 3 for entrainment thereby. Mandrel 12 serves as a holder for a tool 13 extending radially therefrom and terminating in a cutting point whose shape, here trapezoidal, conforms to the profile of a thread to be cut in a tubular workpiece 15. The latter, having an axis A parallel to axis O, is so positioned that the rotating tool 13 cuts a crescent-shaped notch 26 into its inner peripheral wall during each revolution of mandrel 12 and shaft 3, this notch being bounded by an arc $a$ forming part of the inner periphery of tube 15 and by an arc $b$ constituting a segment of the orbit $o$ described by the cutting point of tool 13.

If the shaft 3 and mandrel 12 were axially fixed, i.e. if the angle α were 90°, the orbit $o$ of the tool would lie in a plane perpendicular to axes O and A. With disk 10 and ring 21 inclined as illustrated, the plane P of the orbit includes the same acute angle α with shaft axis O. Notch 26, when seen in elevation, thus substantially corresponds to a section of a helical path having the pitch angle α, the projection of plane P being tangent to this path at the point of deepest penetration of tool 13 into the workpiece. If, now, workpiece 15 is rotated and axially advanced with reference to housing 2, and therefore to the axial midposition of tool 13 which represents the point of deepest penetration, groove 26 is progressively extended into a thread 27, provided of course that the rate of rotation (arrow B) and axial displacement (arrow C) of the workpiece with reference to the tool mounting is so chosen that the path traced by any point of the workpiece is also a helix of pitch angle α. The means for so rotating and axially advancing the workpiece (held in support means 102), e.g. with the aid of a leadscrew of corresponding pitch, have been illustrated diagrammatically at 100 and 101 (second drive means) and may be independent of the drive mechanism 5, 6 for the shaft 3; the rotation of workpiece 15, which should be considerably slower than that of shaft 3, may occur in either sense.

It will be apparent that the pitch angle α of the thread 27 may be changed by adjusting the inclination of disk 10 and concurrently modifying the rate of advance of the workpiece (arrow C) with reference to its rotary speed (arrow B). To change the thread profile, a different tool 13 may be substituted for the tool 13 on mandrel 12.

Whereas the arrangement of FIG. 1 produces a cut which only approximates a segment of helical thread and which therefore must be of relatively limited angular extent, I have shown in FIG. 5 a modification of the axial guide means for shaft 3 whereby the cut is made to coincide completely with the thread to be formed. To this end I provide, in lieu of the planar orbital groove 22 of disk 10, a ramp 28 having a front face 18 engaged by a stud 29 on the spring-loaded plate 8, the profile of ramp face 18 (as seen in the elevational view of FIG. 5) being sinusoidal and tangent to a line L whose inclination with reference to axis O' represents the pitch angle α. The same pitch angle is included between a line P' in FIG. 3, tangent to the orbit o' (see also FIG. 4) of tool 13', and the shaft axis; the orbit o', in contradistinction to the orbit o of the preceding embodiment, is warped and over approximately half its length coincides with a helical path conforming to a thread 27' to be cut in workpiece 15. Owing to this greater coincidence, the crescent-shaped notch 26' (FIG. 4) cut by the tool 13' can extend over a wider arc than in the previous case, e.g. between points 16 and 17 spaced substantially 180° apart.

The sinusodial guide path for the axial reciprocation of the tool, indicated by arrow D in FIG. 3, is particularly useful in the cutting of rectangular thread profiles, as distinct from trapezoidal profiles where the degree of coincidence is less critical.

In FIGS. 3 and 4 I have also shown an advantageous way of mounting the tool 13' (or 13) on its holder. Mandrel 12' is axially split at 30, the gap being bridged by a screw 31 which is integral with the tool 13'; the resiliency of the two slightly separated prongs of the bifurcate mandrel end tends to prevent an unscrewing of bolt 31 and tool 13' from holder 12'.

In FIG. 6 I have illustrated an inversion of the preceding arrangements, including a tubular tool holder 12" whose axis O" is offset from the axis A" of a workpiece 15" whose outer peripheral surface is being threaded at 27" by the tool 13". The principles of operation are the same as in the embodiments described above.

Naturally, the herein disclosed method and apparatus may be embodied in systems deviating in various respects from the specific arrangements described and illustrated without departing from the spirit and scope of my invention as defined in the appended claims.

I claim:

1. A method of threading a workpiece with a cylindrical peripheral surface, comprising the steps of juxtaposing a cutting tool with workpiece surface to be threaded, rotating the tool in a tool holder about an axis offset from but parallel to the workpiece axis with concurrent axial reciprocation of the tool holder at least once per rotation and in step with rotation of the tool whereby the tool moves in an inclined orbit with reference to the axis of rotation and periodically bites into the workpiece surface along a generally crescent-shaped notch substantially coinciding with a section of the thread to be produced, and superimposing upon the rotation and axial reciprocation of said tool a relative rotation and axial advance of the workpiece with reference to the midposition of the axial tool stroke, the rate of said relative rotation and axial advance defining a helical motion at a pitch angle equal to that of said thread.

2. An apparatus for threading a workpiece with a cylindrical peripheral surface said apparatus comprising a tool holder rotatable about and reciprocable along an axis; mounting means for said tool holder; a cutting tool with a generally radially extending point on a projecting extremity of said tool holder; first drive means for rotating and axially reciprocating said tool holder at least once per rotation whereby the point of said tool traces an orbit inclined with reference to said axis; support means for holding said workpiece in a position in which the workpiece axis is offset from but parallel to the axis of rotation of said tool holder, the latter being so disposed inside the workpiece that said orbit intersects said peripheral surface of said workpiece whereby said tool bites into said surface along a generally crescent-shaped notch substantially coinciding with a section of a helical path centered on the workpiece axis; and second drive means for relatively rotating and axially displacing said workpiece and said mounting means at a rate defining a relative helical motion at the pitch angle of said helical path between the workpiece and the point of engagement thereof with said tool in the axial midposition of the latter.

3. An apparatus as defined in claim 2 wherein said holder comprises a shaft centered on said axis of rotation, said first drive means including mechanism for rotating said shaft, a stationary guide member on said mounting means having an orbital formation, and coupling means linking said shaft with said formation for axial reciprocation thereby.

4. An apparatus as defined in claim 3 wherein said coupling means includes spring means urging said shaft axially toward said guide member and means on said shaft engageable with said guide member under the pressure of said spring means.

5. An apparatus as defined in claim 3 wherein said guide member is an inclined disk, said orbital formation being a peripheral groove on said disk.

6. An apparatus as defined in claim 5 wherein said coupling means includes a ring encircling said disk and bearing means in said groove positively connecting said ring and said disk with freedom of relative rotation.

7. An apparatus as defined in claim 5, further comprising means for adjusting the inclination of said disk with reference to said axis of rotation.

8. An apparatus for threading a workpiece with a cylindrical peripheral surface, said apparatus comprising a tool holder rotatable about and reciprocable along an axis; mounting means for said tool holder; a cutting tool with a generally radially extending point on a projecting extremity of said tool holder; first drive means for rotating and axially reciprocating said tool holder at least once per rotation whereby the point of said tool traces an orbit inclined with reference to said axis; support means for holding said workpiece in a position in which the workpiece axis is offset from but parallel to the axis of rotation of said tool holder, the latter being so disposed inside the workpiece that said orbit intersects said peripheral surface of said workpiece whereby said tool bites into said surface along a generally crescent-shaped notch substantially coinciding with a section of a helical path centered on the workpiece axis; and second drive means for relatively rotating and axially displacing said workpiece and said mounting means at a rate defining a relative helical motion at the pitch angle of said helical path between the workpiece and the points of engagement thereof with said tool in the axial midposition of the latter, said holder comprising a shaft centered on said axis of rotation, said first drive means including mechanism for rotating said shaft, a stationary guide member on said mounting means having an orbital formation, and coupling means linking said shaft with said formation for axial reciprocation thereby, said orbital formation having a sinusoidal profile tangent to a plane inclined at said pitch angle with reference to said axis of rotation.

9. An apparatus as defined in claim 8 wherein said guide member is a ramp with an undulating face constituting said orbital formation.

10. An apparatus as defined in claim 8 wherein said first drive means further includes a flywheel on said shaft.

References Cited

UNITED STATES PATENTS 3,209,652  10/1965  Burgsmuller _____ 90—11.42

FOREIGN PATENTS 811,078  4/1959  Great Britain.

ANDREW R. JUHASZ, Primary Examiner

GIL WEIDENFELD, Assistant Examiner

U.S. Cl. X.R.

90—11.64